(12) United States Patent
Vaughn et al.

(10) Patent No.: US 10,904,616 B2
(45) Date of Patent: Jan. 26, 2021

(54) FILTERING OF CONTENT IN NEAR REAL TIME

(71) Applicant: International Business Machines Corporation, Armonk, NY (US)

(72) Inventors: Garfield Vaughn, South Windsor, CT (US); Julija Narodicka, Brno (CZ); Moncef Benboubakeur, Brno (CZ); Anuradha Bhamidipaty, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 157 days.

(21) Appl. No.: 16/181,940

(22) Filed: Nov. 6, 2018

(65) Prior Publication Data

US 2020/0145723 A1 May 7, 2020

(51) Int. Cl.
| | |
|---|---|
| *H04N 21/45* | (2011.01) |
| *H04N 21/431* | (2011.01) |
| *H04N 21/4402* | (2011.01) |
| *H04N 21/44* | (2011.01) |
| *H04N 21/442* | (2011.01) |
| *H04N 21/43* | (2011.01) |
| *H04N 21/25* | (2011.01) |
| *H04N 21/258* | (2011.01) |

(52) U.S. Cl.
CPC ........ *H04N 21/4532* (2013.01); *H04N 21/25* (2013.01); *H04N 21/251* (2013.01); *H04N 21/252* (2013.01); *H04N 21/258* (2013.01); *H04N 21/25841* (2013.01); *H04N 21/25883* (2013.01); *H04N 21/43* (2013.01); *H04N 21/431* (2013.01); *H04N 21/4312* (2013.01); *H04N 21/44* (2013.01); *H04N 21/4402* (2013.01); *H04N 21/44008* (2013.01); *H04N 21/44218* (2013.01); *H04N 21/45* (2013.01)

(58) Field of Classification Search
None
See application file for complete search history.

(56) References Cited

U.S. PATENT DOCUMENTS

| | | | |
|---|---|---|---|
| 5,913,013 | A | 6/1999 | Abecassis |
| 6,072,934 | A | 6/2000 | Abecassis |
| 7,840,986 | B2 | 11/2010 | Ali et al. |
| 8,949,878 | B2 | 2/2015 | Dimitrova et al. |

(Continued)

FOREIGN PATENT DOCUMENTS

EP 1421792 A1 5/2004

*Primary Examiner* — Justin E Shepard
(74) *Attorney, Agent, or Firm* — Nicholas D. Bowman; Hunter E. Webb; Keohane & D'Alessandro, PLLC (57) ABSTRACT

Aspects of the present invention provide an approach for customizing media content being consumed at a location. For each of the viewers in a group consuming the media content at the location, a media profile having a set of media content preferences is created. These media profiles are aggregated to generate a composite profile that has a set of content restriction preferences for the group. As the media content is provided to and being consumed by the group, the media content is analyzed to identify any elements that have attributes that may be unsuitable to some viewers. If an element has a suitability attribute that violates the content restriction preferences for the group, the media content is modified to filter out the element.

20 Claims, 6 Drawing Sheets

(56) References Cited

U.S. PATENT DOCUMENTS

| | | |
|---|---|---|
| 9,165,144 B1 | 10/2015 | Goldstein et al. |
| 2003/0192044 A1 | 10/2003 | Huntsman |
| 2005/0066357 A1 | 3/2005 | Ryal |
| 2009/0138805 A1* | 5/2009 | Hildreth ............. H04N 21/4223 715/745 |
| 2010/0278419 A1* | 11/2010 | Suzuki ................. G06F 16/739 382/155 |
| 2014/0325557 A1* | 10/2014 | Evans ................ H04N 21/4307 725/34 |
| 2016/0323643 A1 | 11/2016 | Panchaksharaiah et al. |
| 2017/0070524 A1* | 3/2017 | Bailey ................. G06F 21/316 |
| 2017/0289624 A1 | 10/2017 | Avila et al. |
| 2017/0372165 A1* | 12/2017 | Jouhikainen ......... G06K 9/4609 |

* cited by examiner

FILTERING OF CONTENT IN NEAR REAL TIME

TECHNICAL FIELD

The subject matter of this invention relates generally to media content delivery. More specifically, aspects of the present invention provide a solution that filters media content in near real time based on the preferences of the viewers of the media content.

BACKGROUND

In today's modern world, the amount of media content, such as audio/video media content, that is available for consumption is ever increasing. Where a few decades ago, there were only a mere handful of channels broadcasting live television, the advent of cable, satellite, and streaming television services has dramatically increased the number of channels that provide media content. Moreover, new streaming services, such as Netflix, Hulu, Youtube, Amazon Prime and others, now provide on demand streaming of media content. (All trademarks and trade names used herein are the property of their respective owners and are used for illustrative and descriptive purposes only.) Added to these, are increased ways of storing media content for later consumption, such as digital video recorders (DVR), digital video disks (DVD), and/or the like.

With the increase of media content options, it has become increasingly difficult to select which content to consume. While some media content may be enjoyable and/or appropriate for most or all audiences, other media content may contain elements that are inappropriate, uncomfortable, unenjoyable, and/or unhealthy for some audience members. This difficulty can become even more challenging when the content is being consumed by a group of viewers, who may have different ages, social backgrounds, health issues, and/or the like.

SUMMARY

In general, aspects of the present invention provide an approach for customizing media content being consumed at a location. For each of the viewers consuming the media content at the location, a media profile having a set of media content preferences is created. These media profiles are aggregated to generate a composite profile that has a set of content restriction preferences for the group. As the media content is provided to and being consumed by the group, the media content is analyzed to identify any elements that have attributes that may be unsuitable to some viewers. If an element has a suitability attribute that violates the content restriction preferences for the group, the media content is modified to filter out the element.

One aspect of the invention provides a method for customizing media content being consumed at a location, comprising: creating, for each viewer of a set of viewers consuming the media content at the location, a media profile having a set of media content preferences; generating a composite profile having a set of content restriction preferences for the set of viewers consuming the media content at the location based on a aggregation of media profiles corresponding to each of the set of viewers; analyzing the media content as the media content is being consumed to identify a suitability attribute for each element within the media content; and modifying the media content to filter out an element within the media content in response to a determination that the suitability attribute violates the set of content restriction preferences.

Another aspect of the invention provides a system for customizing media content being consumed at a location, comprising: a memory medium comprising instructions; a bus coupled to the memory medium; and a processor coupled to the bus that when executing the instructions causes the system to perform a method, comprising: creating, for each viewer of a set of viewers consuming the media content at the location, a media profile having a set of media content preferences; generating a composite profile having a set of content restriction preferences for the set of viewers consuming the media content at the location based on an aggregation of media profiles corresponding to each of the set of viewers; analyzing the media content as the media content is being consumed to identify a suitability attribute for each element within the media content; and modifying the media content to filter out an element within the media content in response to a determination that the suitability attribute violates the set of content restriction preferences.

Yet another aspect of the invention provides a computer program product embodied in a computer readable medium that, when executed by a computer device, performs a method for customizing media content being consumed at a location, the method comprising: creating, for each viewer of a set of viewers consuming the media content at the location, a media profile having a set of media content preferences; generating a composite profile having a set of content restriction preferences for the set of viewers consuming the media content at the location based on an aggregation of media profiles corresponding to each of the set of viewers; analyzing the media content as the media content is being consumed to identify a suitability attribute for each element within the media content; and modifying the media content to filter out an element within the media content in response to a determination that the suitability attribute violates the set of content restriction preferences.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for customizing media content being consumed at a location. For each of the viewers consuming the media content at the location, a media profile having a set of media content preferences is created. These media profiles are aggregated to generate a composite profile that has a set of content restriction preferences for the group. As the media content is provided to and being consumed by the group, the media content is analyzed to identify any elements that have attributes that may be unsuitable to some viewers. If an element has a suitability attribute that violates the content restriction preferences for the group, the media content is modified to filter out the element.

Figure 1:
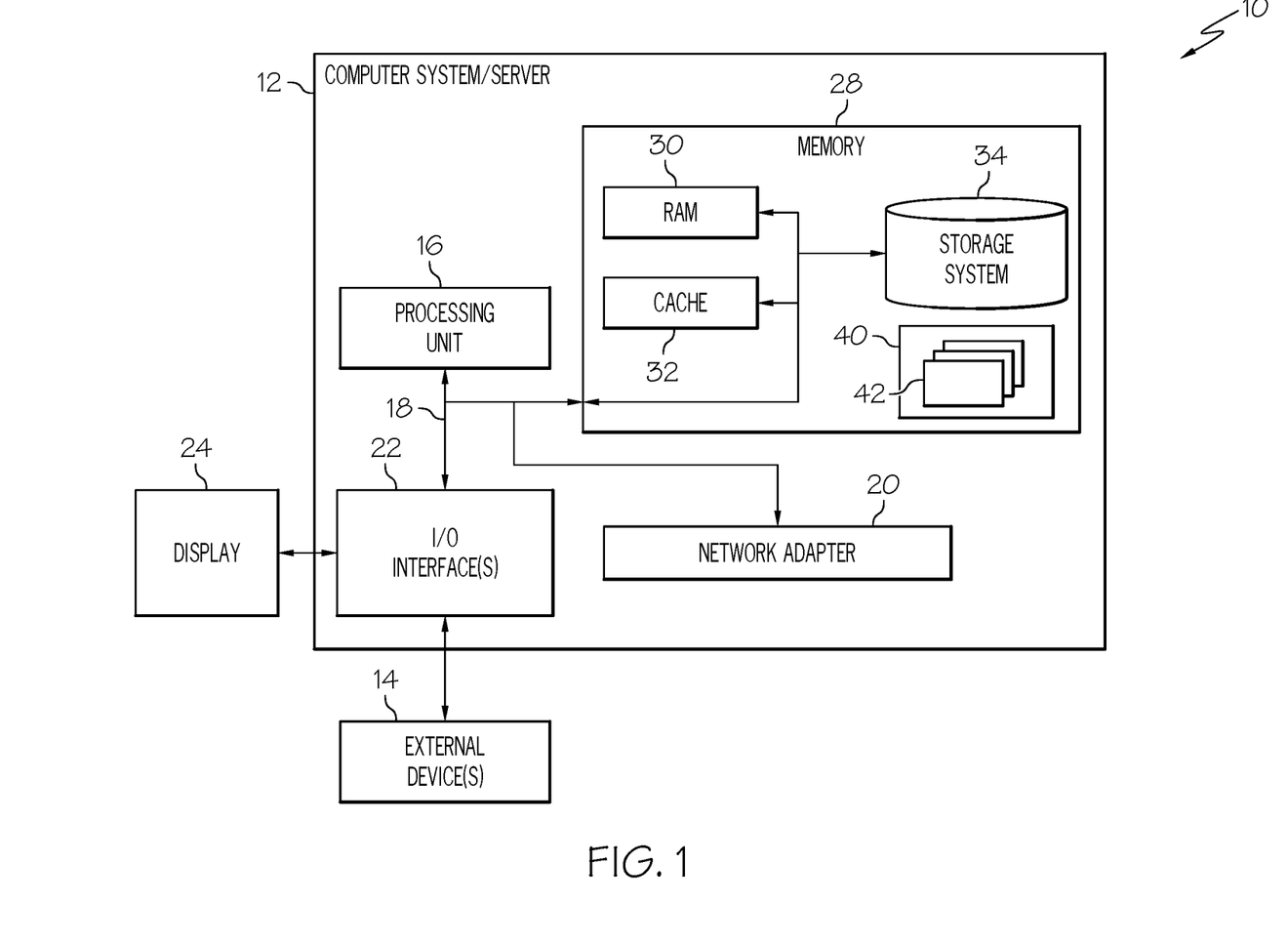
FIG. 1 depicts a data processing system according to an embodiment of the present invention.

Referring now to FIG. 1, a schematic of an example of a data processing system is shown. Data processing system 10 is only one example of a suitable data processing system and is not intended to suggest any limitation as to the scope of use or functionality of embodiments of the invention described herein. Regardless, data processing system 10 is capable of being implemented and/or performing any of the functionality set forth hereinabove.

In data processing system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in data processing system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
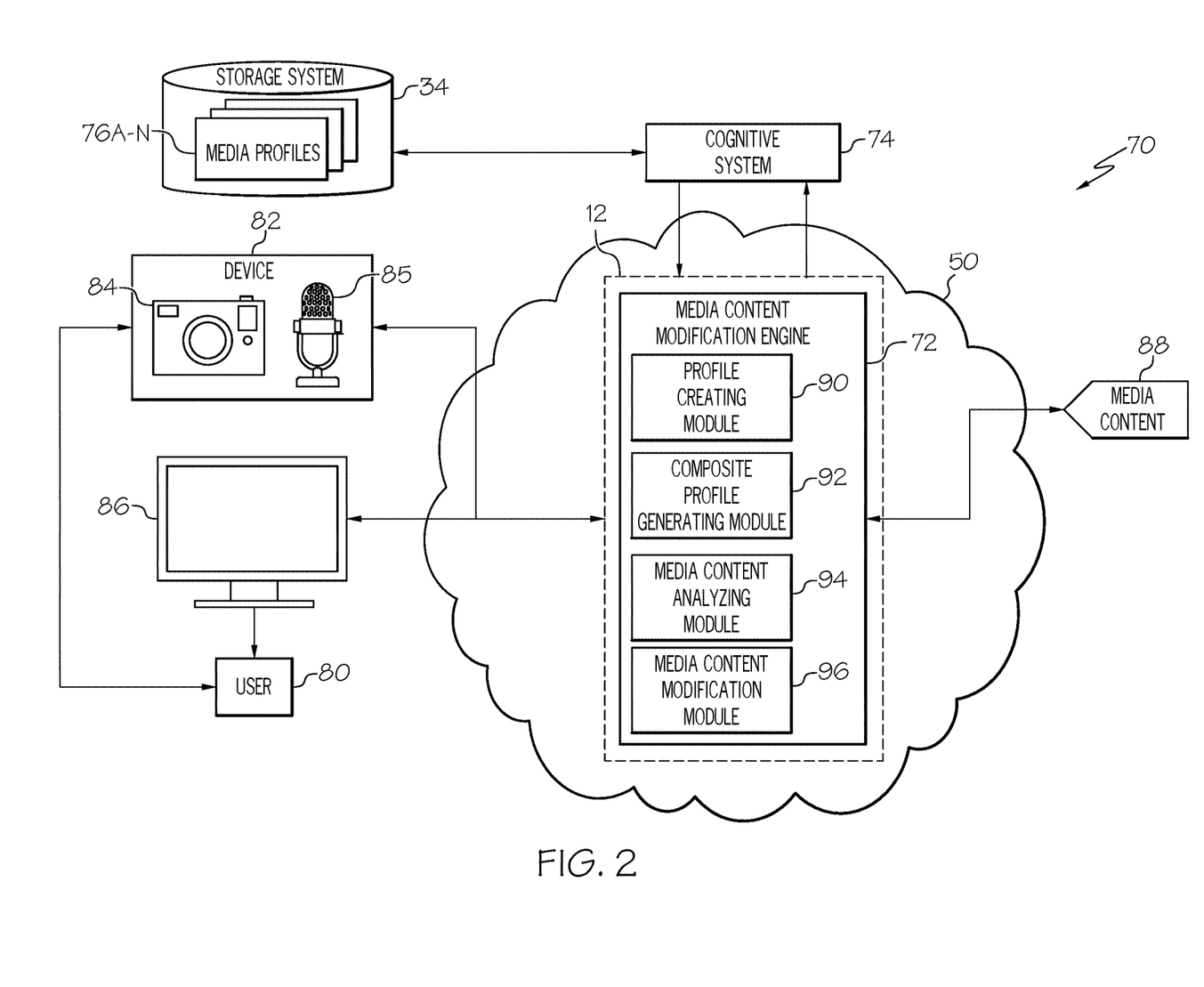
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 2 for illustrative purposes only. In the event the teachings recited herein are practiced in a networked computing environment 70, each display device 86 or set top box (not shown) need not have a media content modification engine (hereinafter "system 72"). Rather, system 72 could be loaded on a server or server-capable device that communicates (e.g., wirelessly) with display device 86 and/or set top box to provide processing therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands to enable display of media content 88 on display device 86. Such other system(s) have not been shown in FIG. 2 for brevity purposes.

Along these lines, system 72 may perform multiple functions similar to a general-purpose computer. Specifically, among other functions, system 72 can customize media content 88 being consumed at a location (e.g., by one or more users 80). To accomplish this, system 72 can include: a profile creating module 90, a composite profile generating module 92, a media content analyzing module 94, and a media content modification module 96.

Figure 3:
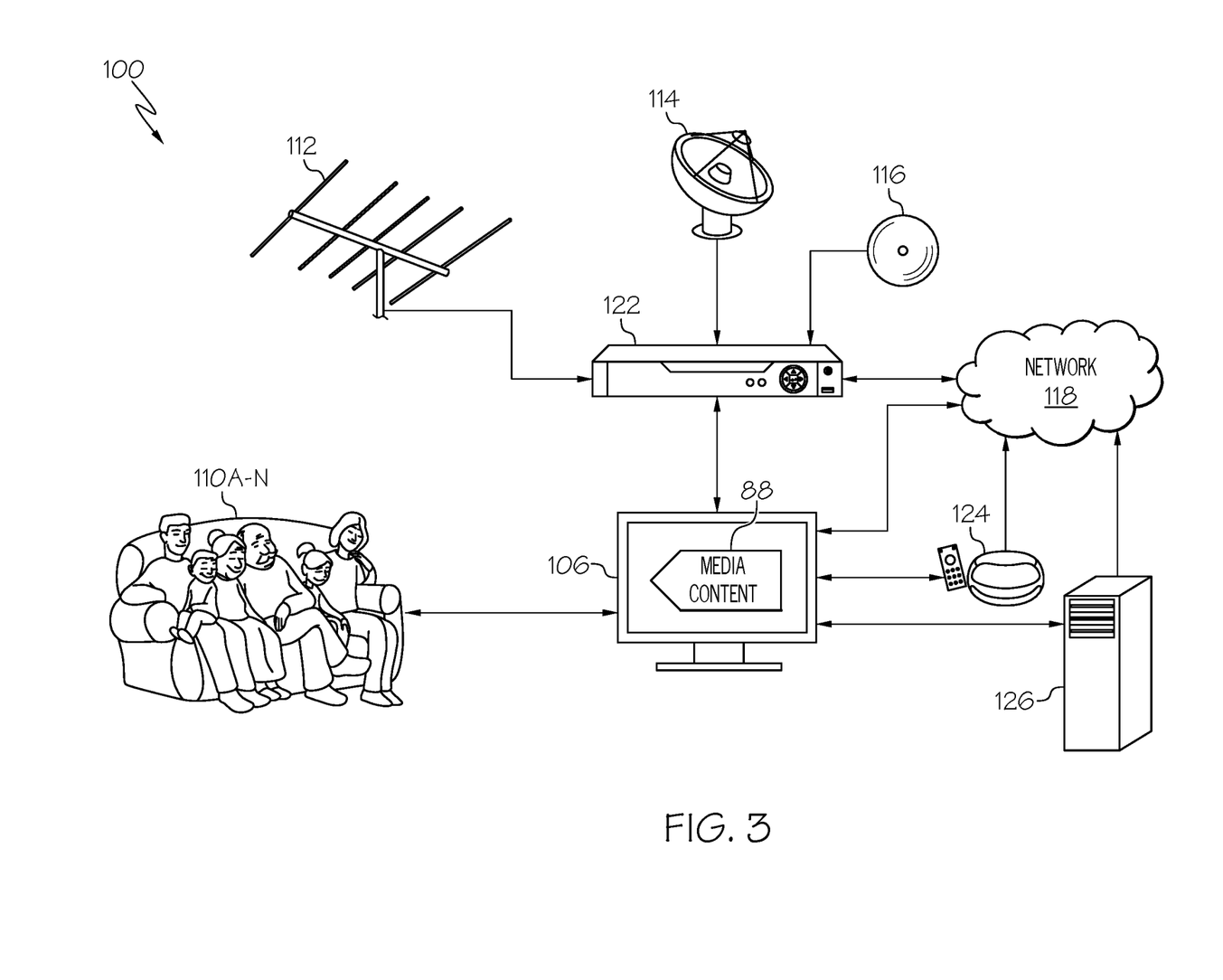
FIG. 3 depicts an example media content consumption environment according to an embodiment of the present invention.

Referring to FIG. 3, an example media content consumption environment 100 is shown according to an embodiment of the invention. As shown, a set of human viewers 110A-N (referred to singularly as "viewer 110N") are consuming media content 88 on a display device 106. To this extent, media content consumption environment 100 can be any location in which set of viewers 110A-N can consume media content 88, including, but not limited to, a living room, a family room, a bedroom, a home theater, a patio, or any other indoor or outdoor area in which a set of viewers 110A-N may congregate to consume media content. Media content 88 being consumed by set of viewers 110A-N can include video content, audio content, text (e.g., subtitle) content, still images, etc. To this extent, display device 106 used by set of viewers 110A-N to view media content 88 can include a television, a computer monitor, a video projection device, a mobile device, one or more speakers, headphones, and/or any other solution for providing media content 88. In any case, display device 106 can obtain media content 88 from one or more media delivery solutions, including, but not limited to: a radio frequency (RF) antenna 112, a satellite antenna 114, a media storage medium 116, over a computer network 118 (e.g., the Internet), and/or any other solution for delivering media content 88 to a display device 106. This media content 88 can be transmitted to display device 106 directly, or, alternatively, can be provided via one or more media decoders, which may include, but are not limited to: a set-top box 122, a streaming box 124, a computer 126 and/or the like. Whatever the case, as shown, media content 88 is being consumed by a plurality of different viewers 110A-N located in the environment, who may have different viewing preferences based on their ages, backgrounds, tastes, sensitivities, etc.

The inventors of the invention described herein have discovered certain deficiencies in the current solutions for providing media content that matches the viewing preferences of a specific audience. For example, most content providers provide the same content to all viewers and do not provide the ability of individual users to "censor" undesired elements from content that they might otherwise be interested in consuming. Some current solutions include assigning ratings (e.g., G, PG, PG-13, R, and NC-17 for movies) to the media content 88. However, the ratings value is typically assigned to the media content 88 as a whole and, as such, may not be reflective of the preferences of individual viewers 110N, instead being either overly restrictive or overly permissive. Further, these ratings often fail to consider factors other than the maturity of the audience, such as health issues, sensitivities, and/or the like.

Other solutions attempt to remedy this by including multiple versions of the same media content 88 that a host can select from based on the host's understanding of the viewing preferences of the viewers 110A-N. However, these solutions can be space and time intensive, requiring multiple versions of the same content to be stored, each of which must be individually prepared. Because of this, only a small percentage of media content 88 and/or sources of media content 88 allow such a selection, and the number of selections allowed may be limited. Furthermore, this solution requires a selection from a viewer 110N and, as such, cannot function in an environment in which viewers 110A-N have no access to the means for making such a selection (e.g., does not have a remote control), such as in a public location like a store, shopping mall, health care institution, waiting room, or the like. Still further, similar to the ratings, these selections may not specifically address the particular factor or factors that are specific to a certain individual viewer 110N or group of viewers 110A-N. Moreover, in cases in which the host has an incomplete knowledge of the personal details (e.g., age, current health, etc.) of each guest, the host may not be equipped to make an informed selection that is not only the preferences of the viewers 110A-N but also potential conflicts between these preferences. In addition, none of the solutions currently available can dynamically alter the filtering when viewers enter or leave the media consumption environment 100.

The approach set forth herein overcomes some or all of these deficiencies in current solutions. To accomplish this, this approach uses real-time classification of media content 88. The media content 88 being consumed is buffered, classified, filtered (e.g., using a cognitive system) and then rendered according to the preferences of the viewers 110A-N in the media consumption environment 100. These preferences are obtained from sources that can include both stored information and social media information regarding each viewer 110N, aggregated into a group profile, and constantly updated based on real-time feedback from the viewers 110A-N. The result is the ability to dynamically and progressively modify any media content 88 from any source to adapt to the specific preferences of the viewers 110A-N that are present in the environment 100, allowing any viewer 110N or group of viewers 110A-N to view any content (with just the unwanted elements filtered out) and saving time, aggravation, and computing resources.

Figure 4:
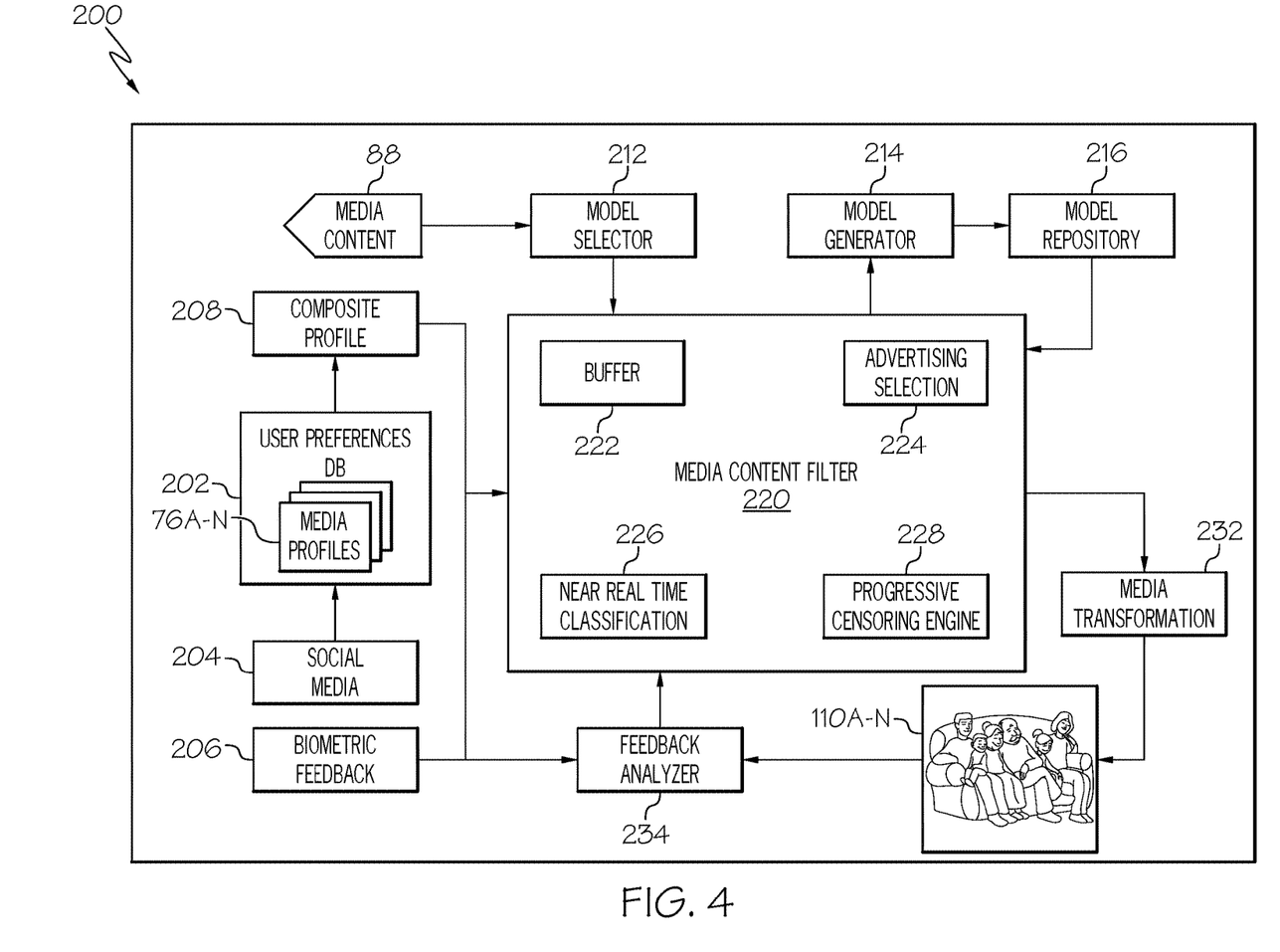
FIG. 4 depicts an example data flow diagram according to an embodiment of the present invention.

Referring now to FIG. 4, an example data flow diagram 200 is depicted according to an embodiment of the current invention. Referring additionally to FIG. 2 in conjunction with FIG. 3, profile creating module 90 of system 72, as executed by computer system/server 12, is configured to create media profiles 76A-N (generically single 76N) for each viewer 110N consuming media content in environment 100. Viewers 110A-N in environment 100 who have opted in to system 72 can be detected using various solutions. In an embodiment, environment 100 can be polled for electronic devices (e.g., cellular telephone, tablets, personal digital assistants, wearables, internet of things devices, health monitoring devices, etc.) located in environment 100, and viewers 110A-N associated with the discovered devices can be identified and queried as to whether they would like to participate in system 72. Additionally or in the alternative, an announcement could by provided to viewers 110A-N that system 72 is in use and asking each viewer 110N to provide an indication if he or she wishes to participate. Then, facial recognition could be performed on viewers 110A-N who opt in based on images from one or more cameras 84 located in environment 100 and/or voice recognition could be performed on sounds from one or more microphones 85 in the environment 100. In any case, each viewer profile 76N can be created based on user preferences stored in and retrieved from a user preference database 202. The resulting media profile 76N, which can be encrypted for privacy and can be purged from system 72 after use, can include information regarding viewer 110N's age, current health status, and/or any other information that may affect viewer 110N's consuming preferences regarding media content 88.

The retrieved user preferences can be augmented in media profiles 76A-N with information from one or more social media 204 accounts associated with viewer 110N. For example, if a particular viewer 110N indicated satisfaction or dissatisfaction with a particular piece, genre, or element of media content 88 in social media 204, the media profile 76A-N associated with the viewer 110N can be augmented to reflect the preference. In an embodiment, the generation and/or augmentation of the media profile 76A-N conditions with social media 204 can be performed by a cognitive system 74 based on the set of user preferences and the information from the social media account. To this extent, cognitive system 74 is a computer system that is configured to provide information and/or determine actions based on provided information and external contextual data. Cognitive system 74 has self-learning attributes that increase the accuracy of the determinations as more information and/or contextual data is provided. In an embodiment, cognitive system 74 can include IBM's Watson Analytics or Watson Personality Insights (Watson and IBM are trademarks of International Business Machines Corporation).

Composite profile generating module 92 of system 72, as executed by computer system/server 12, is configured to generate a composite profile 208 that has a set of content restriction preferences for viewers 110A-N in environment 100. To accomplish this, composite profile generating module 92 (e.g., using cognitive system 74) can aggregate media profiles 76A-N corresponding to each of the set of viewers 110A-N. The resulting composite profile 208 generated by composite profile generating module 92 is unique to the viewers in environment 100 and reflects the specific types of content that would be objectionable, inappropriate, unhealthy, and/or otherwise needing to be filtered out so that every viewer can enjoy the media content 88. Additionally, the composite profile 208 can include one or more thresholds, which may be associated with the profile as a whole or with individual content types therein.

Media content analyzing module 94 of system 72, as executed on computer system/server 12, is configured to identify which elements within media content 88 are and are not suitable for displaying to viewers 110A-N. To accomplish this, media content analyzing module analyzes media content 88 as media content 88 is being consumed and identifies each element within media content 88. This identification can be performed by cognitive system 74 using models that have already been trained by model generator 214 and placed into model repository 216.

Figure 5:
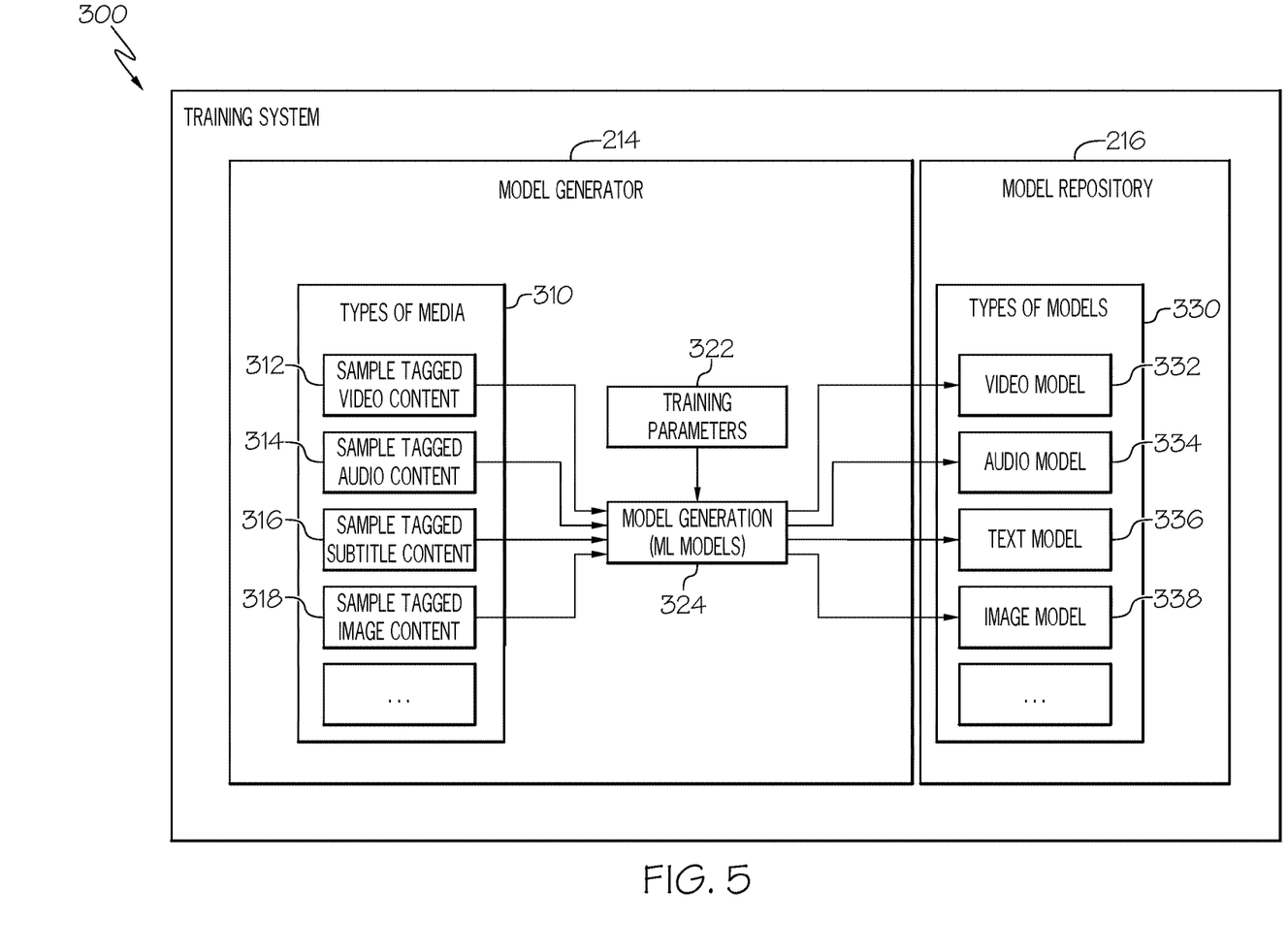
FIG. 5 depicts an example system diagram according to an embodiment of the present invention.

Referring now to FIG. 5, an example training system 300 is shown according to an embodiment. As shown, training system 300 includes a model generator 214 and a model repository 216. Training is accomplished by feeding previously tagged media content 88 (FIG. 2) for one or more types of media 310 into model generator 214. The previously tagged media can include sample tagged video content 312, sample tagged audio content 314, sample tagged subtitle content 316, sample tagged image content 318, and/or any other type of media 310 for which training is desired. In any case, the previously tagged media are run through a model generation learning system 324 (e.g., cognitive system 74), where the previously tagged media are processed according to training parameters 322 to create new types of models 330. As illustrated, these new types of models 330 include video model 332, audio model 334, text model 336, image model 338, etc., corresponding to types of media 310 used to create them. In any case, the newly generated models can be stored in model repository 216 for use by media content analyzing module 94.

Referring again to FIG. 4 in conjunction with FIGS. 2 and 3, in order to identify suitability attributes in the media content 88 elements, model selector 212 selects one or more of the generated content models (e.g., audio, video, subtitles, captions, etc.) from model repository 216 based on at least one element contained in the incoming media content 88. As the media content 88 is received, the media content 88 is placed into a buffer 222. Near real time classification 226 applies the selected set of content models to the buffered media content 88 (typically a few frames and a small audio sample). The results of this analysis of the buffered media content 88 based on the selected models are consolidated to identify a content genre (e.g., horror, vulgarity, etc.), and a confidence level is assigned to the designation.

Once the genre has been identified, each element of media content 88 in buffer 222 can be compared to the selected set of content models (e.g., using cognitive system 74). Based on this comparison, suitability attributes can be assigned to the elements that indicate whether or not the particular element may or may not be suitable to certain viewers 110A-N. For example, a suitability attribute for language may indicate that the language in the element may be unsuitable for viewers 110A-N under the age of 13 and viewers 110A-N who have certain religious preferences. In another example, a suitability attribute for stressful elements (e.g., horror, suspense, etc.) may indicate that the images and/or audio elements may be unsuitable for viewers 110A-N under a certain age or viewers 110A-N who have certain medical conditions. Each of these suitability attributes can also be assigned a confidence level that indicates a probability that the particular suitability attribute has been identified correctly.

Media content modification module 96 of system 72, as executed on computer system/server 12, is configured to modify media content 88 to filter out one or more elements within media content 88 that are not suitable for displaying to viewers 110A-N. To accomplish this, media content modification module 96 determines whether the suitability attribute identified by media content analyzing module 94 violates the set of content restriction preferences in composite profile 208. This determination can be performed based on a comparison of the suitability attribute with the composite profile 208 using the cognitive system. In an embodiment, real-time biometric feedback 206 (e.g., from medical monitoring devices associated with one or more viewers 110A-N) can also be utilized in making this determination. If it is determined that the element is unsuitable, progressive censoring engine 228 can perform a "censoring" action of the element to filter out the unsuitable content. This action include reducing or muting the sound, blurring an image, changing a subtitle, skipping a scene, and/or any other solution for filtering media content 88 that is now known or later developed. In cases in which a scene is skipped, progressive censoring engine 228 can fast forward to the end of the scene. Alternatively, in an embodiment (e.g., in which not enough buffer exists to fast forward to the end of the scene), advertising selection 224 can replace the media content 88 with an advertisement or other relatively short length media selection until such time as the scene has ended and resumption of the media content 88 can occur.

In an embodiment, progressive censoring engine 228 can progressively modify the filtering based on one or more factors. For example, assume that the cognitive system 74's comparison of the suitability attribute for an element with the composite profile 208 indicates that a suitability attribute exceeds a tolerance in the composite profile. Progressive censoring engine 228 can censor the element entirely (e.g., mute the sound, remove the subtitle, skip the scene, etc.) and the media transformation 232 can be provided for consumption to viewers 110A-N. Alternatively, assume that the cognitive system 74's comparison of the suitability attribute for an element with the composite profile 208 indicates a match, but that the suitability attribute is below the tolerance in the composite profile 208 but approaches the composite profile (e.g., within a predetermined percentage). Progressive censoring engine 228 can partially censor the element (e.g., incrementally lower the sound, edit words in the subtitle, blur portions of the scene, etc.) and the media transformation 232 can be provided for consumption to viewers 110A-N. In addition, media content filter 220 can continue to monitor media content 88 and progressively increase the level of filtering as the confidence increases. For example, assume that the accuracy threshold in composite profile 208 is set for 80% for a horror scene at which point the sound is to be muted but that the comparison only yields a confidence level of 60%. Progressive censoring engine 228 can begin reducing the sound volume slowly and can continue to reduce the volume as the confidence level increases, muting the sound entirely when the confidence level reaches 80%.

This progressive censoring can also be progressively modified based on feedback from viewers 110A-N. In an embodiment, feedback analyzer 234 can analyze various forms of feedback from viewers 110A-N who have opted in as media content 88 is being displayed and use the feedback to retrain the system. In an embodiment, this feedback can include user actions that override the decisions from progressive censoring engine 228. For example, the viewer 110N may perform an action (e.g., using a remote control device) to lower the volume during an intense scene, raise the volume after media content filter 220 has lowered it, fast-forward through a scene, rewind to a scene that media content filter 220 has skipped, and/or any other action performed by viewer 110N. Additionally, or in the alternative, the feedback can include feedback information from viewers 110A-N gathered from external devices 82 that may indicate a reaction of viewers 110A-N to media content or emotional state of viewers 110A-N. These external devices can include, but are not limited to, a microphone 85, a camera 84, and/or a medical monitoring device. For example, in the event that a viewer 110N is wearing a medical monitoring device and that device indicates that the viewer 110N's heart rate or blood pressure exceeds a safe level, progressive censoring engine 228 can further modify media content 88 (e.g., to remove and/or minimize the effect of intense scenes).

Figure 6:
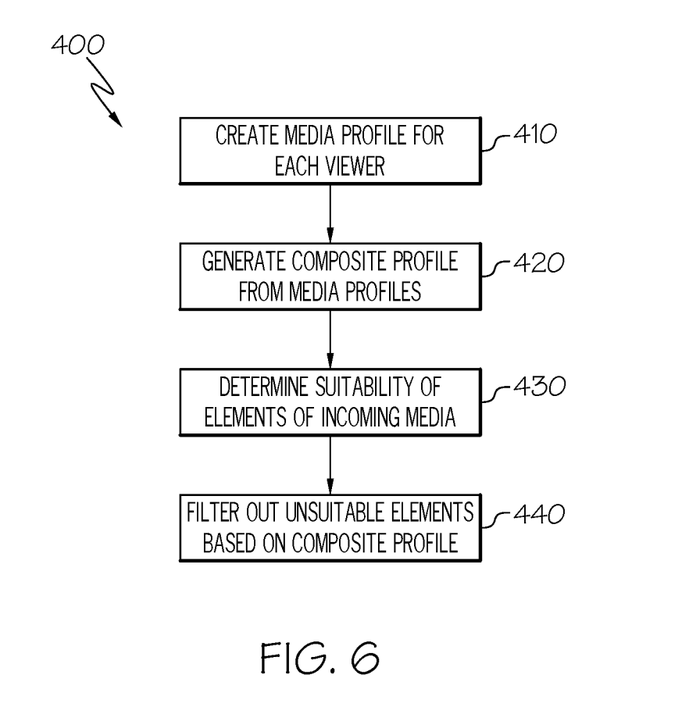
FIG. 6 depicts an example process flowchart according to an embodiment of the present invention.

Referring now to FIG. 6 in conjunction with FIG. 2, a process flowchart 400 according to an embodiment of the present invention is shown. At 410, profile creating module 90 of system 72, as executed by computer system/server 12, creates a media profile for each viewer 110N of a set of viewers 110A-N consuming media content 88 at a location. Each media profile has a set of media content preferences specific to the viewer 110N to which it corresponds. At 420, composite profile generating module 92, as executed by computer system/server 12, generates a composite profile that has a set of content restriction preferences pertaining to all viewers 110A-N consuming the media content 88 at the location. This composite profile is generated based on an aggregation of the media profiles corresponding to each of the set of viewers 110A-N in the location. At 430, media content analyzing module 94, as executed by computer system/server 12, analyzes media content 88 as media content 88 is being consumed to identify a suitability attribute for each element within media content 88. Finally, at 440, media content modification module, as executed by computer system/server 12, modifies media content 88 to filter out an element within media content 88 in response to a determination that the suitability attribute violates the set of content restriction preferences in the composite profile.

The process flowchart of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the Figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for customizing media content being consumed at a location, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for customizing media content being consumed at a location. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for customizing media content being consumed at a location. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media/(e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for customizing media content being consumed at a location. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for customizing media content being consumed at a location, comprising:
    creating, for each viewer of a set of viewers consuming the media content at the location, a media profile having a set of media content preferences;
    generating a composite profile having a set of content restriction preferences for the set of viewers consuming the media content at the location based on a aggregation of media profiles corresponding to each of the set of viewers;
    analyzing the media content as the media content is being consumed to identify a suitability attribute for each element within the media content; and
    modifying the media content to filter out an element within the media content in response to a determination that the suitability attribute violates the set of content restriction preferences, the modifying including:
        censoring the element entirely in response to the suitability attribute corresponding to the element exceeding a tolerance in the composite profile; and
        partially censoring the element in response to the suitability attribute approaching the tolerance.

2. The method of claim 1, wherein the analyzing further comprises:
    selecting a set of content models based on at least one element contained in the media content;
    applying the selected set of content models to a section of the media content; and
    identifying a content genre based on the applying.

3. The method of claim 2, wherein the analyzing further comprises:
    identifying the suitability attribute by comparing each element of the media content to the selected set content models using a cognitive system; and
    assigning a confidence level to each identified suitability attribute.

4. The method of claim 3, wherein the modifying further comprises:
    comparing the suitability attribute with the composite profile using the cognitive system.

5. The method of claim 1, wherein the element is filtered out with an action selected from a group consisting of: reducing a sound, blurring an image, changing a subtitle, and skipping a scene.

6. The method of claim 1, wherein the creating of the media profile for each viewer further comprises:
 retrieving a set of user preferences from a user preference database; and
 augmenting the set of user preferences with information from a social media account associated with the viewer.

7. The method of claim 1, further comprising:
 monitoring physical reactions of the set of viewers in response to the media content; and
 modifying the composite profile based on the physical reactions.

8. A system for customizing media content being consumed at a location, comprising:
 a memory medium comprising instructions;
 a bus coupled to the memory medium; and
 a processor coupled to the bus that when executing the instructions causes the system to perform a method, comprising:
  creating, for each viewer of a set of viewers consuming the media content at the location, a media profile having a set of media content preferences;
  generating a composite profile having a set of content restriction preferences for the set of viewers consuming the media content at the location based on a aggregation of media profiles corresponding to each of the set of viewers;
  analyzing the media content as the media content is being consumed to identify a suitability attribute for each element within the media content; and
  modifying the media content to filter out an element within the media content in response to a determination that the suitability attribute violates the set of content restriction preferences, the modifying including:
   censoring the element entirely in response to the suitability attribute corresponding to the element exceeding a tolerance in the composite profile; and
   partially censoring the element in response to the suitability attribute approaching the tolerance.

9. The system of claim 8, wherein the analyzing further comprises:
 selecting a set of content models based on at least one element contained in the media content;
 applying the selected set of content models to a section of the media content; and
 identifying a content genre based on the applying.

10. The system of claim 9, wherein the analyzing further comprises:
 identifying the suitability attribute by comparing each element of the media content to the selected set content models using a cognitive system; and
 assigning a confidence level to each identified suitability attribute.

11. The system of claim 10, wherein the modifying further comprises:
 comparing the suitability attribute with the composite profile using the cognitive system.

12. The system of claim 8, wherein the element is filtered out with an action selected from a group consisting of: reducing a sound, blurring an image, changing a subtitle, and skipping a scene.

13. The system of claim 8, wherein the creating of the media profile for each viewer further comprises:
 retrieving a set of user preferences from a user preference database; and
 augmenting the set of user preferences with information from a social media account associated with the viewer.

14. The system of claim 8, further comprising:
 monitoring physical reactions of the set of viewers in response to the media content; and
 modifying the composite profile based on the physical reactions.

15. A computer program product embodied in a computer readable medium that, when executed by a computer device, performs a method for customizing media content being consumed at a location, the method comprising:
 creating, for each viewer of a set of viewers consuming the media content at the location, a media profile having a set of media content preferences;
 generating a composite profile having a set of content restriction preferences for the set of viewers consuming the media content at the location based on a aggregation of media profiles corresponding to each of the set of viewers;
 analyzing the media content as the media content is being consumed to identify a suitability attribute for each element within the media content; and
 modifying the media content to filter out an element within the media content in response to a determination that the suitability attribute violates the set of content restriction preferences, the modifying including:
  censoring the element entirely in response to the suitability attribute corresponding to the element exceeding a tolerance in the composite profile; and
  partially censoring the element in response to the suitability attribute approaching the tolerance.

16. The program product of claim 15, wherein the analyzing further comprises:
 selecting a set of content models based on at least one element contained in the media content;
 applying the selected set of content models to a section of the media content; and
 identifying a content genre based on the applying.

17. The program product of claim 16, wherein the analyzing further comprises:
 identifying the suitability attribute by comparing each element of the media content to the selected set content models using a cognitive system; and
 assigning a confidence level to each identified suitability attribute.

18. The program product of claim 17, wherein the modifying further comprises:
 comparing the suitability attribute with the composite profile using the cognitive system,
 wherein the element is filtered out with an action selected from a group consisting of: reducing a sound, blurring an image, changing a subtitle, and skipping a scene.

19. The program product of claim 15, wherein the creating of the media profile for each viewer further comprises:
 retrieving a set of user preferences from a user preference database; and
 augmenting the set of user preferences with information from a social media account associated with the viewer.

20. The program product of claim 15, further comprising:
 monitoring physical reactions of the set of viewers in response to the media content; and
 modifying the composite profile based on the physical reactions.

* * * * *